United States Patent [19]

Weibelzahl et al.

[11] 4,309,749

[45] Jan. 5, 1982

[54] CIRCUIT HAVING IMPROVED FIRING ANGLE SYMMETRY FOR IGNITION PULSES IN THE CONTROL OF A MULTIPULSE RECTIFIER

[75] Inventors: Manfred Weibelzahl, Weiher; Wolfgang Meusel; Kurt Schaumman, both of Erlangen, all of Fed. Rep. of Germany

[73] Assignee: Siemens Aktiengesellschaft, Berlin and Munich, Fed. Rep. of Germany

[21] Appl. No.: 145,491

[22] Filed: May 1, 1980

[30] Foreign Application Priority Data

May 13, 1979 [DE] Fed. Rep. of Germany ....... 2922249

[51] Int. Cl.³ ............................................. H02P 13/24
[52] U.S. Cl. ..................................... 363/87; 363/129; 307/252 Q
[58] Field of Search ....................... 363/54, 85, 86, 87, 363/128, 129; 307/252 N, 252 Q

[56] References Cited

U.S. PATENT DOCUMENTS 3,683,261  8/1972  Holtz et al. ....................... 363/87 X
3,821,629  6/1974  Liss ......................................... 363/51
3,865,438  2/1975  Boksjo et al. ......................... 363/54
4,042,873  8/1977  Cox ..................................... 363/129

Primary Examiner—William M. Shoop
Assistant Examiner—Peter S. Wong
Attorney, Agent, or Firm—Kenyon & Kenyon

[57] ABSTRACT

Ignition control signals for a multipulse controlled rectifier are combined in a sequence which is fed through a first time delay stage to a phase control circuit having a voltage-controlled oscillator which generates a phase-locked, gated, highly accurate square-wave oscillation as a trigger pulse series. The ignition control signals and the trigger pulse series of the voltage-controlled oscillator are conjunctively coupled in and gates are then amplified to form firing (ignition) pulses. A second time delay stage is provided for safety, in the event of dynamic control processes, and follows the first time delay stage. The output signals of the second time delay stage are linked to the ignition control signals in additional and gates and are subsequently amplified. Should the phase control circuit be unable to follow the changes of the ignition control signals in the event of dynamic changes in the control processes, the ignition pulse formed after the response delay of the second time delay stage is utilized.

7 Claims, 3 Drawing Figures

CIRCUIT HAVING IMPROVED FIRING ANGLE SYMMETRY FOR IGNITION PULSES IN THE CONTROL OF A MULTIPULSE RECTIFIER

BACKGROUND OF THE INVENTION

1. Field of the Invention

The present invention relates to circuits for controlling a multipulse rectifier by means of ignition pulses. More particularly, the invention relates to such circuits in which the timing between the start of each ignition pulse used for controlling the main valves of the rectifier is precisely regulated.

2. Discussion of the Prior Art

In known control units for rectifiers, a periodic reference voltage generated by an oscillator synchronized by a clocking AC voltage, such as a triangular voltage, is compared with a DC control voltage (DIN 41750 of February 1972, Sheet 7, Page 4, FIG. 2). The points of intersection of the periodic reference voltage and the DC control voltage determine the starting points of the firing control pulses and, hence, of the fired pulses. The oscillator frequency is usually chosen so that two ignition pulses, mutually staggered by 180° (electrical), are formed in one period and fed to the control path of the associated controlled main valves of the rectifier. Therefore, only one oscillator is required for a two-pulse rectifier. Where control units for higher-pulse rectifiers are involved, a number of comparisons between phase-shifted periodic reference voltages of several oscillators and the DC control voltage is made. For example, three such oscillators, generating reference voltages which are phase-shifted by 60°, may be provided for a six-pulse recitifier. The oscillators can be adjusted "soft" so that they are able to follow dynamic control processes which can cause phase jumps in the clocking AC voltage.

It is a requirement that, for the prevention of asymmetries in the output voltage of the recitifier, the time intervals between the starts of the ignition pulses for the controlled main valves of the recitifier be equi-distant as accurately as possible. This means that, for high accuracy requirements, the oscillators and comparators must be balanced against each other very precisely and must show only minor changes in response due to the effect of temperature change or due to aging.

It is also possible to provide a control unit for a higher-pulse rectifier which has only a single oscillator and which generates a periodic reference voltage of a correspondingly higher frequency for comparison with the DC control voltage. The ignition pulses derived therefrom are switched cyclically to the controlled recitifier main valves. In steady-state operation, good firing angle symmetry can be achieved with such a circuit, provided the stability of the oscillator is sufficient. However, such a "hard"-adjusted oscillator is then unable to follow dynamic control processes associated with phase jumps in the clocking AC voltage.

It is an object of the present invention to provide an improved control unit for a multi-pulse rectifier having an improved firing angle symmetry.

SUMMARY OF THE INVENTION

According to the invention, this problem is solved in a circuit having the following elements:

(a) means for forming a control signal sequence from the ignition (firing) control signals;

(b) means for delaying the control signal sequence by predetermined time, corresponding roughly to the greatest possible asymmetry of the ignition control signals;

(c) means for forming a highly accurate series of trigger pulses from the delayed control signal sequence which is a phase-lock linked to the delayed control signal sequence; and (d) means for the conjunctive linkage of the ignition control signals to the series of trigger pulses.

The invention is based on the premise that, in a control unit for a multipulse recitifier, the ignition control signal control signals, which are determined by comparison of the periodic reference output voltage of an oscillator controlled by a clocking AC voltage with a DC control voltage, are subjected to certain inaccuracies respecting the time intervals of their rising flanks. Despite these inaccuracies of the ignition control signals, it is desirable for the ignition pulses of the controlled valves to be as equidistant as possible. To this end, the ignition control signals are first combined into a control signal sequence in which the time intervals between the rising flanks of successive pulses are likewise subject to such an inaccuracy. This control signal sequence is delayed and energizes, as a delayed control signal sequence, a phase control circuit which derives a trigger pulse sequence of the same frequency. The trigger pulse sequence is phase-lock-linked to the delayed control signal series fed to it and the time intervals of the rising flanks of successive pulses are equidistant with extremely great accuracy. The actual ignition pulses are now obtained by conjunctive linkage of the original ignition control signals to the trigger pulse sequence of the phase control circuit, and by their subsequent amplification. Each start of an ignition pulse is determined by the rising flanks of the trigger pulses of the phase control circuit. Accordingly, the intervals of the ignition pulses are determined by the great accuracy of the trigger pulse sequence of the phase control circuit. Regardless of the adjustment of the oscillator which generates the periodic reference voltage, the phase control circuit can be adjusted so that its pulses follow each other at extremely accurate intervals.

The invention can be applied without problems to control units having ignition pulse patterns in which the ignition pulses for valves carrying current do not overlap. It applies to ignition pulse patterns in which only one ignition pulse is transmitted for each current-carrying time period of a valve as well as to ignition pulse patterns with double pulses in which the ignition pulse for the valve next in line for conduction is also supplied to the preceding valve. For control units having ignition pulse patterns with overlapping ignition pulses, the invention can be applied in such a way that very precisely equidistant ignition control signals, which do not overlap each other, are formed first in the manner described, are then appropriately extended by succeeding timing stages, and, finally, are subsequently amplified.

The invention can be used to advantage in control units for multipulse rectifiers having several oscillators for generation of phase-shifted periodic reference voltages and several comparators for comparison of the periodic reference voltages with a DC control voltage. The oscillators for generating the period reference voltage may be adjusted so "soft" as to be able to follow phase jumps of the clocking AC voltage quickly. Inaccuracies in the firing angle symmetry are precluded by the intervention of the phase control circuit. In particular, expensive balancing of the individual oscillators for generation of the periodic reference voltages and of the comparator circuits, as was required hitherto for highly exact firing angle symmetry, is no longer necessary.

The invention also offers an advantage in the case of control units for multipulse rectifiers in which the output pulses of only a single oscillator for the generation of a periodic reference voltage and only a single comparator for comparison of the periodic reference voltage with a DC control voltage are switched cyclically to the various controlled main valves of the rectifier. In such a control unit the oscillator generating the periodic reference voltage can now be adjusted so that it can also rapidly follow phase jumps in the clocking AC voltage.

In the event of dynamic control processes which cause phase jumps in the clocking AC voltage, a "hard"-adjusted phase control circuit may, in some circumstances, be unable to follow the phase jump in the control signal series received at its input fast enough. To be able to continue controlling the rectifier with ignition pulses in the correct sequence just the same, an embodiment of the invention with the following features is provided:

(a) means for the formation of a second control signal sequence having a delay which is longer than that of the first control signal sequence; and (b) means for conjunctive linkage of the ignition control signals to the second control signal sequence.

This further embodiment of the invention starts from the premise that an ignition pulse is transmitted, in any case, when a certain period of time after the start of the ignition control signal has elapsed. Accordingly, the intervention of the phase control circuit is overridden until a steady state is reestablished.

DETAILED DESCRIPTION OF THE INVENTION

Figure 1:
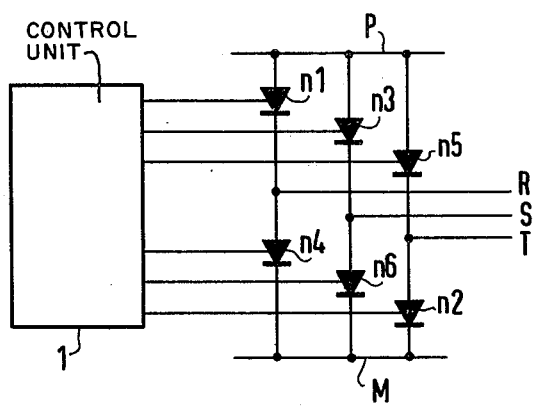
FIG. 1 is a schematic diagram of a six-pulse rectifier controlled by a control unit.

FIG. 1 shows, schematically, a six-pulse rectifier having six controlled main rectifier valves n1 to n6 in a bridge circuit, by which a three-phase voltage RST is transformed into a DC voltage which appears between phase and ground N. The control electrodes of the controlled main valves, shown as thyristors, are addressed by ignition pulses from a control unit 1.

Figure 3:
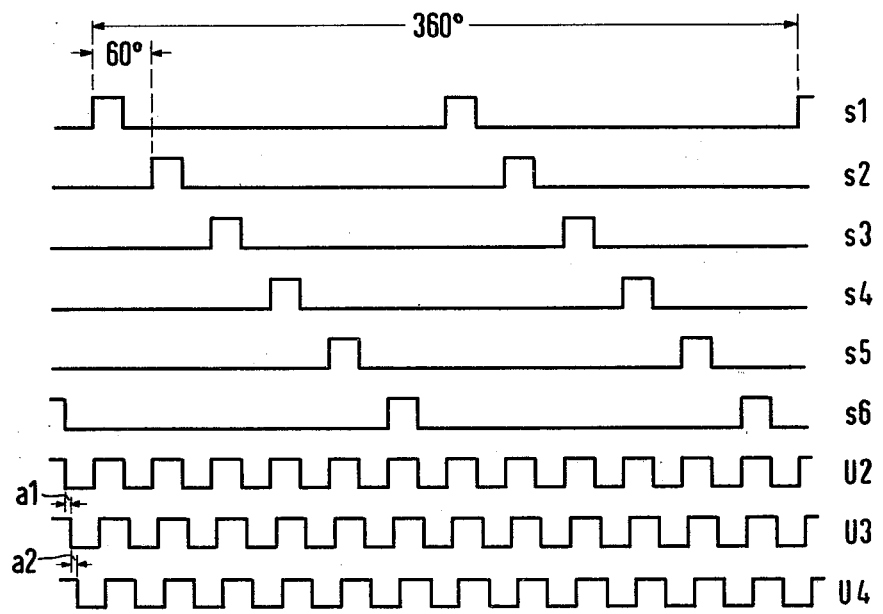
FIG. 3 shows pulse diagrams illustrating the timing of events in the circuit of FIG. 2.
Figure 2:
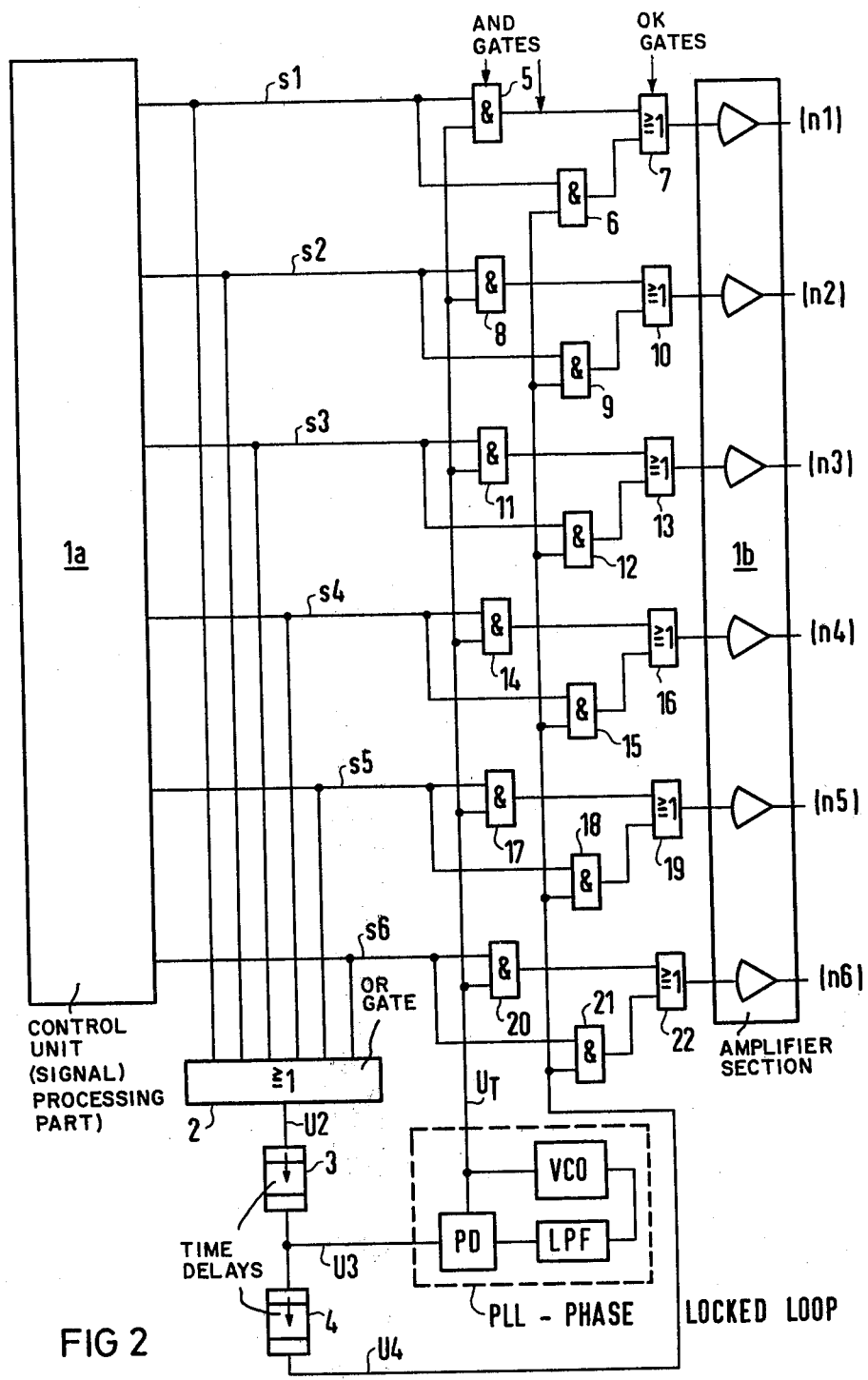
FIG. 2 is a block diagram of a control unit having a circuit for controlling a rectifier in accordance with the invention.

FIG. 2 shows control unit 1 divided into a signal-processing part 1a which contains the synchronizing unit, comprising three oscillators and associated comparators and pulse formers for generating periodic reference voltages, feeding an output amplifier section 1b containing output amplifiers and, if applicable, pulse transformers. This may be a commercially available control unit. In the present application the not-overlapping output signals s1 to s6 of the signal-processing part 1a are called "ignition control signals," since they are at the signal processing level. The ignition control signals s1 to s6 (see FIG. 3) are amplified in the amplifier section 1b to form the actual ignition pulses for the controlled main valves of the rectifier. The rising flanks of the ignition pulses should be equidistant as accurately as possible. In a six-pulse rectifier, for instance, these spacings should be 60° (electrical), as exactly as possible. In known control units, however, the spacings of the rising flanks often have certain time irregularities which may be caused by inaccurate balancing of the oscillators and comparators, by different temperatures of the various oscillators and comparators, and by the effects of different temperature responses and of aging of the components. The present invention makes it possible to derive highly accurate ignition pulses from ignition control signals which are inaccurate with respect to their firing angle symmetry.

Disposed between signal-processing section 1a and amplifier section 1b of control unit 1 is a circuit arrangement for the improvement of the firing angle symmetry according to the invention. It contains an OR gate 2 for the disjunctive linkage of all ignition control signals s1 to s6 for controlled main valves n1 to n6. A control signal sequence U2 (see FIG. 3) appears at the output of OR gate 2. When the spacings of the rising flanks of the ignition control signals are not exactly equidistant, the pulses of the combined control signal sequence U2 are not exactly equidistant either. Control signal sequence U2 is fed to a time delay stage 3, having a response delay a1 (FIG. 3) which corresponds to the greatest possible error of equidistance between the ignition control signals of the signal-processing part 1a of the control unit. A delayed control signal sequence U3 appears at the output of time delay stage 3; the sequence is shifted timewise by the amount a1, relative to the control signal sequence output U2 of OR gate 2. The delayed control signal output sequence U3 of time delay stage 3 is fed to a phase control circuit PLL. Suitable phase control circuits are known, for example, by the name phase locked loop (PLL) and are commercially available. In the literature, such phase control circuits are described, for instance, in the article by J. A. Mattis "The Phase-Locked Loop—A Communication System Building Block" (Broadcasting Engineering, February 1972), or in the article by Dr. Joachim Zieman "Operation and Application of Integrated Phase-Locked Loop Circuits") Der Elektroniker, No. 1/1973, EL 14-19). Design and aplication examples are described in the company publication by Signetics, "Linear Integrated Circuits," at pages 195-304.

Phase control circuit PLL contains a phase detector PD, followed by a lowpass filter LPF. The output of lowpass filter LPF is connected via an amplifier, if needed, to the control voltage input of a voltage controlled oscillator VCO which generates a square-wave oscillation as trigger pulse series $U_T$. The signal sequence U3 of time delay stage 3 and the trigger pulse series $U_T$ of the voltage controlled oscillator VCO are applied to the discriminator inputs of phase detector PD. If the two pulse sequences fed to the phase detector PD differ from each other, the phase detector will generate a difference signal which, after a delay brought about by the lowpass filter LPF, modifies the control voltage for voltage-controlled oscillator VCO in the sense that the trigger pulse sequence of the voltage-controlled oscillator VCO is caused to track the delayed control signal sequence U3. Since the variations of the time intervals of the rising flanks of the pulses of the control signal sequence U2 or U3, respectively, cancel each other out in the average, a suitable adjustment of the parameters of the lowpass filter LPF, results in generation by voltage-controlled oscillator VCO of a trigger pulse sequence with a highly accurate, equidistant rising flanks; the sequence is not affected by the deviation of individual pulses of the control signal sequence. Voltage-controlled oscillator VCO of phase control circuit PLL thus generates a highly accurate sequence of square-wave pulses as a trigger pulse sequence which, on the average, is shifted timewise by the amount a1 relative to the signal control sequence U2 of OR gate 2.

Ignition control signals s1 to s6 are linked conjunctively to the trigger pulse sequence $U_T$ of voltage-controlled oscillator VCO in AND gates 5, 8, 11, 14, 17 and 20 to form the ignition pulses. The output of AND gates 5, 8, 11, 14, 17 and 20 are connected via OR gates 7, 10, 13, 16, 19 and 22 to the output amplifiers in amplifier section 1b of the control unit. In this manner, the rising flanks of the ignition pulses are determined by the highly accurate equidistant rising flanks of the trigger pulses of voltage-controlled oscillator VCO in phase control circuit PLL.

In the example shown, the rectifier valves of the six-pulse rectifier are driven by ignition pulses of about 30° (electrical), only one ignition pulse being provided for each current-carrying time period. Such control units require no further measures, provided the ignition control signal length does not exceed 60° (electrical). Nor are further measures required in control units which address the rectifier valves in every current-conduction time period with a double pulse derived from the ignition pulses for successively ignited valves, if the signal-processing part 1a of the control unit already generates appropriate ignition control signals for double pulses. If the rectifier valves are driven by long pulses which overlap each other, such as 110° pulses in a six-pulse rectifier, a signal-processing part 1a is used to generate ignition control signals which do not overlap. The amplifiers in amplifier section 1b are preceded by time delay stages which appropriately extend the ignition control signals which are corrected according to the invention.

In the event of dynamic control processes, phase jumps in the clocking AC voltage and very rapid changes of the ignition control signal may occur and the pulses of the control signal sequence U2 of OR gate 2 and of time delay stage 3 may change with corresponding rapidity. Due to the delaying influence of its low-pass filter, voltage-controlled oscillator VCO will be unable to follow these changes quickly enough. To obtain the required ignition pulses in the correct sequence just the same, another time delay stage 4 is provided, the input side of which is connected to the output of first time delay stage 3. The response delay of second time delay stage 4 is set to a value a2 which is roughly of the same order of magnitude as the value a1 of time delay stage 3. The input of second time delay state 4 may, in the alternative, be directly connected to the output of OR gate 2. In that case, its response delay must be greater than that of first time delay stage 3. In any event, there appears at the output of the second time delay stage 4 another delayed control signal sequence U4 (see FIG. 3) which is shifted by more than a1 relative to the control signal sequence U2 at the output of OR gate 2.

Furthermore, second AND gates 6, 9, 12, 15, 18 and 21 are provided, the first input of each of the gates being connected to one ignition control signal s1 to s6 of the signal-processing part 1a of the control unit, and the second input of each of the gates being connected to the output of second time delay stage 4. The outputs of additional AND gates 6, 9, 12, 15, 18 and 21 are coupled to the output amplifiers in the amplifier section 1b of the control unit via OR gates 7, 10, 13, 16, 19 and 22.

If, for example, an ignition control signal s1 appears, but, for whatever reason, particularly due to dynamic control processes, a trigger pulse from voltage-controlled oscillator VCO does not drive AND gate 5 into conduction, the blocking gate 6 is driven into conduction by second time delay stage 4 no later than after the total lapsed time of a1+a2, and an ignition pulse is formed with this time delay. This assures the ignition of the main valve a1. The resultant time delay of the ignition pulse, relative to the ignition control signal, can be tolerated because equidistant ignition pulses cannot be demanded for dynamic processes.

The circuit arrangement shown can also be expanded to 12-pulse and 24-pulse rectifiers by appropriate multiplication of the gates.

What is claimed is:

1. In a control circuit for supplying firing pulses to a multipulse rectifier by the amplification of ignition control signals, the start of each of which is determined by comparing the periodic reference voltage output of an oscillator controlled by a clocking AC voltage with a DC control voltage, the improvement comprising:
   (a) means for forming a first control signal sequence from the ignition control signals;
   (b) means for delaying the control signal sequence by a period of time substantially corresponding to the greatest possible time asymmetry of the ignition control signals;
   (c) means for forming a highly accurate trigger pulse sequence from the delayed control signal sequence which is phase-locked to the delayed control signal sequence; and
   (d) means for conjunctively linking the ignition control signals to the trigger pulse sequence to form corrected ignition control pulses for the multipulse rectifier.

2. In a circuit in accordance with claim 1, the further improvement comprising:
   the means for forming a control signal sequence comprising an OR gate having inputs to one of which the ignition control signals are supplied and at whose output the control signal sequence appears.

3. In a circuit in accordance with claim 1, the further improvement comprising:
   the means for delaying the control signal sequence comprising a timing stage having a preset delay, to the input of which the control signal sequence is supplied and at the output of which the delayed control signal sequence appears.

4. In a circuit in accordance with claim 1, the further improvement comprising:
   the means for forming a highly accurate trigger pulse comprising a phase control circuit having a phase detector which is coupled to a voltage-controlled oscillator; and
   the phase detector having as input the output of the voltage-controlled oscillator carrying the trigger pulse sequence and the delayed control signal sequence.

5. In a circuit in accordance with claim 1, the further improvement comprising:
   the means for conjunctively linking comprising a number of first AND gates, to one input of each of which is coupled an ignition control signal for a controlled main valve of the rectifier, and to another input of each of which the trigger pulse sequence is coupled.

6. In a circuit in accordance with claim 1, the further improvement comprising:
   (a) means coupled to the ignition control signals for forming a second delayed control signal sequence providing a delay longer than that of the first control signal sequence;
   (b) means for conjunctively linking the ignition control signals to the second delayed control signal sequence to form the corrected ignition control pulses.

7. In a circuit in accordance with claim 5 the further improvement comprising:

(a) a second time delay stage having a preset delay, the input to the second time delay stage being coupled to the output of the first time delay stage;
   (b) a number of second AND gates, to the first input of each of which the ignition control signal for a controlled main valve of the rectifier is supplied and to the second input of each of which the output of the second time delay stage is supplied;
   (c) a number of OR gates, one input of each gate being coupled to an output of one of the first AND gates and one input of each gate being coupled to a corrected ignition control signal for a controlled main valve of the rectifier.

* * * * *